United States Patent [19]

Quinn et al.

[11] Patent Number: 4,578,755

[45] Date of Patent: Mar. 25, 1986

[54] MICROPROCESSOR CONTROLLED TIMING/TACHOMETER APPARATUS

[75] Inventors: Robert O. Quinn, Kenosha, Wis.; Craig F. Govekar, Gurnee, Ill.; James R. Piehl, Kenosha, Wis.

[73] Assignee: Snap-on Tools Corporation, Kenosha, Wis.

[21] Appl. No.: 441,078

[22] Filed: Nov. 12, 1982

[51] Int. Cl.⁴ .................... G01M 15/00; G01P 21/02
[52] U.S. Cl. ................. 364/431.01; 364/569; 364/565; 324/391
[58] Field of Search ............... 123/416, 414, 407, 428; 364/424, 442, 569, 431.04, 511, 431.05, 431.01, 564; 324/391; 73/119 A

[56] References Cited

U.S. PATENT DOCUMENTS

| | | | |
|---|---|---|---|
| Re. 31,392 | 9/1983 | Schirmer et al. | 123/414 |
| 3,978,720 | 9/1976 | Ford | 324/391 |
| 4,125,894 | 11/1978 | Cashel et al. | 364/442 |
| 4,136,558 | 1/1979 | Lukes et al. | 364/559 |
| 4,259,723 | 3/1981 | Fujisawa et al. | 364/431.04 |
| 4,292,670 | 9/1981 | Reid et al. | 364/511 |
| 4,312,043 | 1/1982 | Frank et al. | 364/551 |
| 4,331,029 | 5/1982 | Wilson | 324/391 |
| 4,376,428 | 3/1983 | Hata et al. | 364/431.04 |
| 4,426,974 | 1/1984 | Nash | 123/416 |
| 4,467,763 | 8/1984 | Gillespie et al. | 364/431.05 |

Primary Examiner—Errol A. Krass
Assistant Examiner—Thomas G. Black
Attorney, Agent, or Firm—Emrich & Dithmar

[57] ABSTRACT

The apparatus comprises a combustion sensor to sense the combustion event in an engine, and a magnetic sensor to sense top dead center. Electrical signals from the sensors are converted to two trains of pulses which are applied to a microprocessor. Under the stored program, the microprocessor determines the time between pulses in one train and converts such time into engine speed in rpm. Also, the microprocessor determines degrees of rotation between corresponding pulses in the two trains. The offset angle, which is applied to a keyboard is subtracted from the degrees of rotation to provide the timing angle. The engine speed and timing angle appear in digital displays.

15 Claims, 8 Drawing Figures

MICROPROCESSOR CONTROLLED TIMING/TACHOMETER APPARATUS

BACKGROUND OF THE INVENTION

In analyzing the timing of an internal combustion engine, determination is made of the number of degrees of rotation (timing angle) between the instant a piston in a selected cylinder reaches its so-called "top dead center" position and the instant that combustion takes place in that cylinder. Automobile manufacturers commonly specify the timing angle at a specific engine speed as a compromise to numerous considerations which must be taken into account, such as reducing emissions, maximizing gas mileage, optimizing performance, etc. For example, an automobile manufacturer may specify that combustion should start five degrees after the piston has reached top dead center at an engine speed of 1,250 rpm.

A timing/tachometer apparatus must identify the events of top dead center and combustion. The top dead center event is identified in the following manner. An internal combustion engine includes a wheel mounted on the end of the engine crank shaft so as to rotate therewith. A notch, projection or other marking means is located at a point in the periphery of the wheel. A receptacle for a magnetic sensor is carried by the engine block and is so located that the notch on the rotating wheel will pass the receptacle a known number of degrees of crank shaft rotation after the number one cylinder has reached it top-dead-center position. In presently manufactured diesel engines, such known number or "offset angle" is either 20° or 9.5°, while in current spark-ignited engines, the offset angle is one of a number of possibilities: 9.5°, 10°, 20°, 52.5°, 68°, 135° or 190°. The magnetic sensor, which is part of the timing/tachometer apparatus, has a transducer to provide an electrical signal when the cylinder is at top dead center plus the offset angle.

In a diesel engine, the combustion event may be sensed by light occurring during combustion. In a diesel engine, fuel is first delivered to a prechamber. To increase the temperature of the prechamber to a value to insure engine starting, a so-called "glow plug" is threaded into an access port of each such prechamber. The glow plug is energized a few seconds before starting; but, while the engine is actually operating, the glow plug is not energized. The glow plug for the prechamber associated with the cylinder being analyzed is removed and a luminosity probe inserted in its place. The luminosity probe includes a sensor which responds to light produced during the combustion event and generates an electrical signal.

In a spark-ignited engine, the combustion event is identified by sensing energization of the spark plug associated with the number one cylinder. A clip having a transformer therein is applied to the conductor connected between the distribution and that spark plug. An electrical signal is magnetically generated in the clip.

The electrical signal produced in response to the top-dead-center event and the electrical signal in response to the combustion event are applied to apparatus which determines and displays the timing angle between the two. The serviceman timing the engine can make adjustments in order that the displayed number matches the timing angle specified by the manufacturer for a particular speed.

Another important parameter which must be determined is engine speed. A timing meter usually has a tachometer associated with it. Some currently available timing/tach meters are capable of analyzing a diesel engine. Others are capable of analyzing a spark-ignited engine, thereby necessitating twice the number of pieces of equipment a service station must purchase and maintain.

Most current timing/tach meters are of the analog type so that the timing angle is indicated by the instantaneous location of a pivoting pointer. A pointer's position is more difficult to read than a digital display. Although there are some timing/tach meters that display timing angle and speed digitally, they are not as accurate as is required under certain circumstances. Moreover, the numbers on such digital displays change rapidly (referred to as "bobbling") making it more difficult to read. Analog tachometers do not have sufficient range on one scale to display engine speed through the entire range of speeds which the tachometer must evaluate. Instead, a knob must be adjusted to change ranges.

Analog tachometers are very difficult to use for checking cranking engine speeds, (the speed of the engine as it is being started) of between 150 and 200 rpm. The quivering of the pointer is especially severe during cranking, making it more difficult to read.

As above explained, the notch or other marking means located in the flywheel is related to top dead center of the number one cylinder. Therefore, a combustion event in the number one cylinder will supply information on the timing angle of that cylinder. There are circumstances when it is important to evaluate timing in one or more of the other cylinders. Currently available timing meters do not accommodate that because the amount of offset angle provided by the timing meter is fixed. In a few instances, the offset angle can be selected from one or two values. To evaluate timing of cylinders other than the number one cylinder requires the capability of programming other offset angles into the timing meter.

Certain presently available tachometers enable determination of spark-ignited engine speed by using signals from the inductive probe, and other tachometers enable determination of such engine speed by using signals from the magnetic probe. There are certain instances in which it is desirable to use one and in other instances in which it is desirable to use the other. In current diesel-engine tachometers, engine speed is determined by the use of the magnetic pickup probe.

Some automobiles have two notches or projections on the flywheel. Conventional timing/tach meters are not able satisfactorily to analyze timing because of an inability to distinguish between the two.

SUMMARY OF THE INVENTION

It is therefore an important object of the present invention to provide a single piece of equipment capable of analyzing the timing and speed of either a diesel engine or a spark-ignited engine.

Another object is to provide a timing/tachometer apparatus which is capable of analyzing engine speed and timing over wide ranges.

Another object is to provide a timing/tachometer apparatus which measures engine speed and timing angle at a very high degree of accuracy.

Another object is to provide a timing/tachometer apparatus which digitally displays speed and timing angle in a more readable manner than heretofore available.

Another object is to provide a tachometer which displays engine speed from 20 to 8,000 rpm without having to change range.

Another object is to provide a tachometer which digitally displays engine speed during cranking and is readily readable.

Another object is to provide a timing meter capable of analyzing the timing in any cylinder of an internal combustion engine and to enable timing of all the various diesel and spark-ignited engines which have many different offset angles.

Another object is to provide a timing meter which is capable of timing an automobile in which the flywheel has two notches or projections thereon.

Another object is to provide a timing/tachometer apparatus which is capable of digitally displaying engine speed by determining the frequency of any selected one of the following: (1) top dead center events in either a spark-ignited engine or a diesel engine, or (2) luminosity events in a diesel engine or (3) spark events in a spark-ignited engine.

In summary, there is provided timing/tachometer apparatus for an internal combustion engine having a rotating part with mark means that passes a fixed point a predetermined offset angle after top dead center of a selected cylinder, the timing apparatus comprising a first sensor adapted to be coupled in operative relation with the selected cylinder for producing recurring first electrical signals in response to recurring combustion in the selected cylinder; first circuit means for converting the first electrical signals into a train of first pulses; a second sensor adapted to be mounted adjacent to the fixed point for producing recurring second electrical signals in response to recurring rotation of the rotating part; second circuit means for converting the second electrical signals into a train of second pulses; keyboard means for manually receiving the predetermined offset angle; processor means coupled to the first and second circuit means and to the keyboard means and operating under stored program for: (a) determining the time between the pulses in one of the trains and converting such time into engine speed in rpm, (b) determining the degrees of rotation between a first pulse and a second pulse, and (c) subtracting the degrees of offset angle from the degrees of rotation to provide the engine timing angle in degrees; and means for digitally displaying the engine speed and the engine timing angle.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
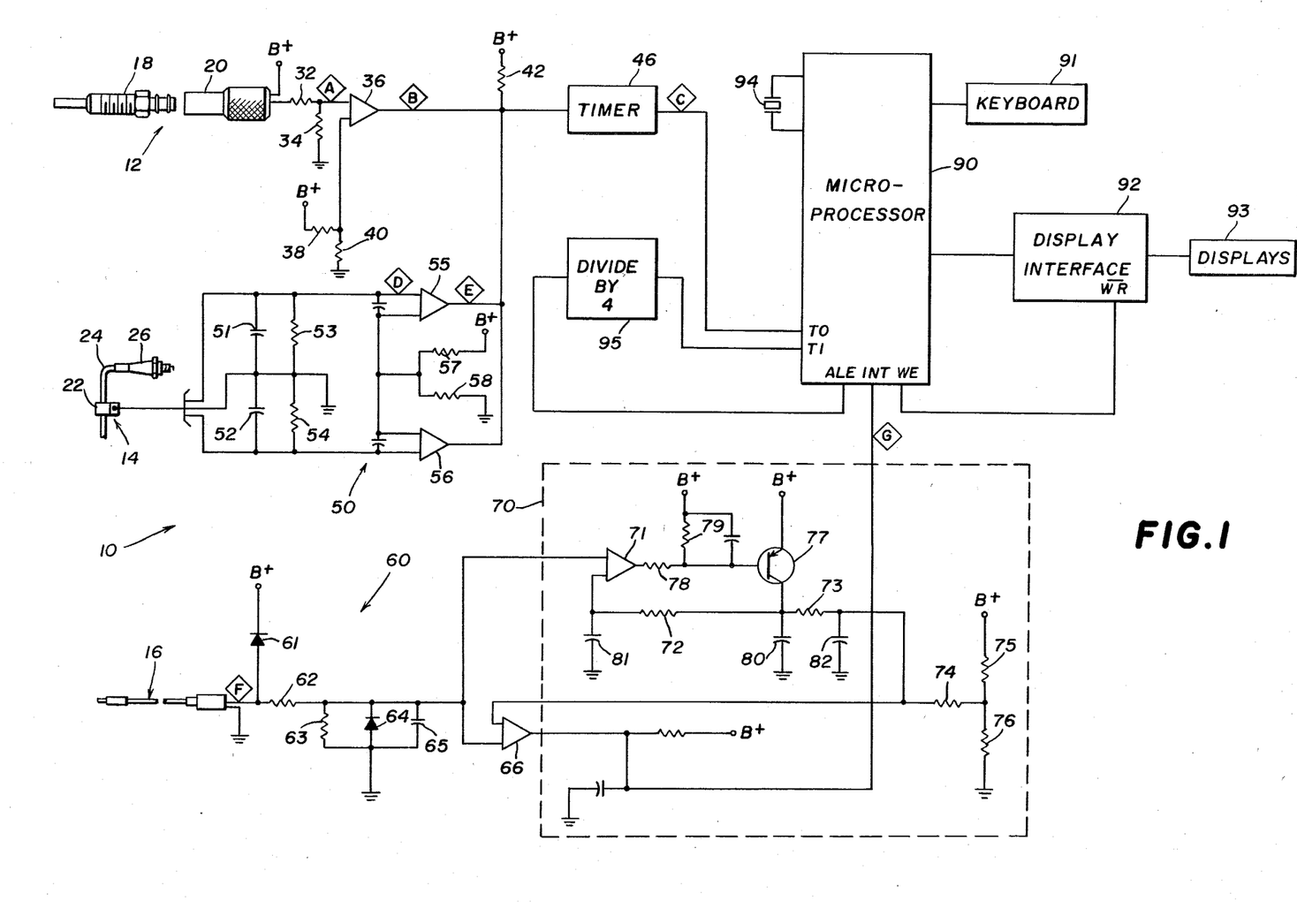
FIG. 1 depicts a timing/tachometer, microprocessor-controlled apparatus, partially in block and partially in schematic, incorporating the features of the present invention.

Turning now to the drawings, and more particularly to FIG. 1 thereof, there is depicted a timing/tachometer apparatus 10 incorporating the features of the present invention and being used to analyze and time an internal combustion engine which may be either diesel or spark ignited. In analyzing both types of engines, the combustion event must be determined. In the case of a diesel engine, the combustion event is sensed by light occurring during combustion, while in a spark-ignited engine, the combustion event is sensed by current being applied to the spark plug. Top dead center is sensed in the same manner for both engines, namely by sensing a discontinuity in the flywheel. Therefore, the apparatus 10 comprises three sensors, a luminosity sensor 12 which senses combustion in a diesel engine, an inductive sensor 14 to sense current to the spark plug in a spark-ignited engine, and a magnetic sensor 16 to sense the discontinuity in the flywheel.

First, considering the luminosity sensor 12, a cylinder in a diesel engine has an associated prechamber which in turn has a threaded opening to accommodate a glow plug. The glow plug for the number one cylinder is removed and replaced by the luminosity sensor 12, the details of which are described in a copending application owned by the same assignee as the present application, Ser. No. 285,942, filed July 23, 1981 now U.S. Pat. No. 4,441,021. The luminosity sensor 12 includes a first part 18 which is threaded into the glow plug opening, and a second part 20 which has a central opening therethrough in order to be pushed onto the first part 18. A light pipe (not shown) is housed within the part 18 and transmits light from the engine cylinder to the detector in the part 20 where it is converted into electrical signals.

The inductive sensor 14 includes a clip 22 which can be applied to the conductor 24 that connects the distributor of the spark-ignited engine to a spark plug 26. During combustion in the cylinder to which the spark plug 26 is attached, current flows through the conductor 24 inducing a magnetic field in the clip 22 which is converted to an electrical signal.

As previously explained, the crankshaft of an internal combustion engine carries a rotating flywheel or vibration damper in the periphery of which is a notch, projection or other discontinuity. That discontinuity passes a fixed point a predetermined number of degrees, or "offset angle", after the piston in the number one cylinder reaches top dead center. The sensor 16 is positioned at the fixed point and magnetically responds to the discontinuity to provide an electrical signal. In some diesel engines, the offset angle is 9.5° and in others it is 20°. In spark-ignited engines, the offset angle can have one of a number of values between, for example, 9.5° and 190°.

Returning to the luminosity sensor 20, power therefor is derived from the B+ supply voltage and through resistors 32 and 34 to ground, the junction of such resistors being coupled to the signal input of a comparator 36, its reference input being coupled to the junction of resistors 38 and 40 coupled in series between the B+ supply voltage and ground. A pull-up resistor 42 is connected between the comparator output and the B+ supply voltage. The electrical signal from the luminosity sensor 12, depicted in FIG. 2A, includes three portions of irregular shape, the latter two being extraneous. Each of the three, however, has an amplitude exceeding the threshold at the control input of the comparator 36, whereby the output of the comparator 36 includes three rectangular pulses corresponding to the three irregular portions, as depicted in FIG. 2B.

A timer 46 produces a timer pulse starting with the inception of the electrical signal produced by the luminosity sensor 12 and terminating a fixed angle or time thereafter. The fixed time is established to be somewhat shorter than the duration between successive luminosity signals at the highest speed at which the engine will be analyzed, such as 7,500 rpm. The extraneous pulses will not have any effect since the ensuing circuitry responds to the inception of the timer signal. By making the timer pulse almost as long as the time between successive pulses (at high engine speeds), rejection of spurious signals is accomplished. The timer pulse produced by the timer 46 is depicted in FIG. 2C, the pulse commencing at 0°, the start of the first of the signal portions in FIG. 2A and terminating subsequent to the third portion at angle $a_2$. In a specific example, the duration of the timer pulse was 15 ms. The next timer signal starts at $a_6$.

The sensor 14 contains a center-tapped coil 22 having its center tap coupled to ground. Current passing through the conductor 24 produces signals at the ends of the coil 180° out of phase. The sensor 14 is coupled to a processing circuit including capacitors 51 and 52 coupled in series across the coil in the clip 14 as are a pair of resistors 53 and 54. The junction of the capacitors 51 and 52 and the junction of the resistors 53 and 54 are connected to ground. Current from the coil 22 charges the capacitors 51 and 52 in a known way and is applied to the signal inputs of comparators 55 and 56, the reference inputs of which are coupled together and to the junction of resistors 57 and 58 connected in series between the B+ supply voltage and ground, thereby establishing a reference voltage at such reference inputs. When the level of the inductive signal from the clip 22 exceeds the reference voltage, the comparator switches. The inductive signal is a decaying sine wave depicted in FIG. 2D and the output of the comparators 55 and 56 is depicted in FIG. 2E. The signal from the processing circuit 50 is also applied to the timer 46 and it responds in a manner discussed above to provide a timer pulse as depicted in FIG. 2C.

Figure 2:
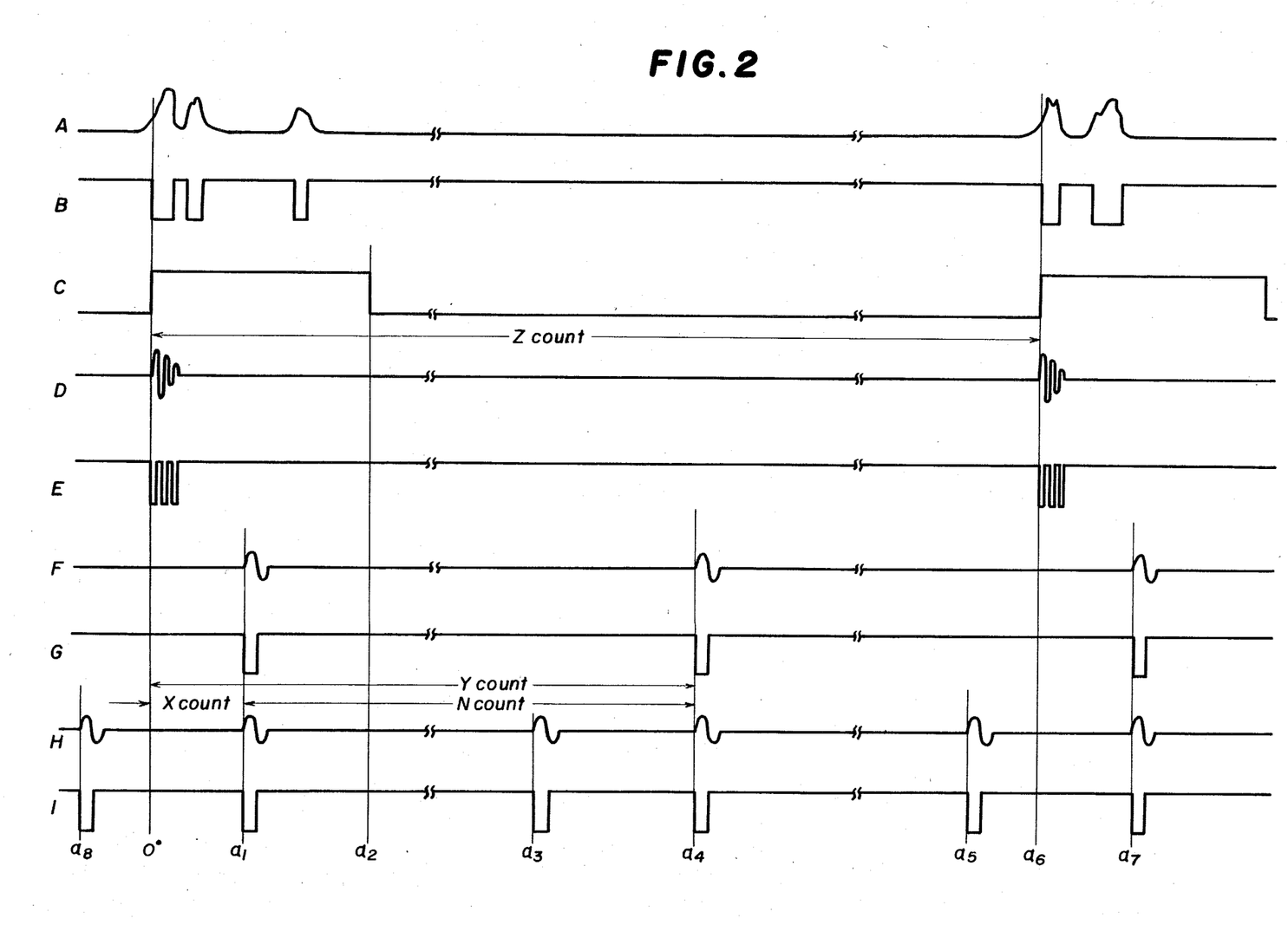
FIG. 2 depicts wave forms at various points in the circuit of FIG. 1.

The elements 32–42 and the timer 46 may be said to be a circuit for converting the luminosity electrical signals into a train of first pulses, two of which are depicted in FIG. 2C. Alternatively, the circuit 50 and the timer 46 constitute a circuit to convert the inductive electrical signals into a train of first pulses. The train of first pulses is produced in accordance with combustion in the selected cylinder whether in a diesel engine or a spark-ignited engine.

The electrical signal produced by the magnetic sensor 16 in response to the top-dead-center event is applied to a processing circuit 60 which includes a diode 61 to clamp the signal to a predetermined level for protecting the remainder of that circuit. The signal is reduced in amplitude by means of a pair of resistors 62 and 63 connected in series. A diode 64 connected across the resistor 63 is also for protection purposes by clipping negative signal excursions. A capacitor 65 also coupled across the resistor 63 attenuates high frequency current produced by the magnetic pickup coil. The signal at the junction of the resistors 62 and 63 is applied both to the signal input of a comparator 66 and to a peak-detecting circuit 70. The circuit 70 includes a comparator 71 having its reference input coupled through resistors 72, 73 and 74 to the junction of resistors 75 and 76 connected in series between the B+ supply voltage and ground, thereby placing a reference voltage on the reference input of the comparator 71. Resistor 78 connected between the comparator 71 and the base of the transistor 77 limits the base current. A resistor 79 supplies current to the base of the transistor 77. A capacitor 80 connected between the collector of the transistor 77 and ground is charged quickly when the transistor 77 is energized, causing the voltage at the reference input of the comparator 71 to increase. The resistor 72 and a capacitor 81 provide a low pass filter circuit to preclude fast transitions from being applied to the comparator 71. The capacitor 80 stores the peak of the incoming signal applied to the comparator 71. The resistor 73 and a capacitor 82 provide another low pass filter to preclude fast transitions from being applied to the reference input of the comparator 66. The resistors 73, 74 and 76 also divide the peak signal appearing at the capacitor 80. Resistors 75 and 76 establish a voltage to appear at the reference input of the comparator 66 in order to insure that the output of the comparator 66 is normally high with no signal present.

The signal at the signal input of the comparator 66 is compared to the portion of the peak voltage applied to the reference input as measured over a relatively long period of time. If the signal input exceeds the reference input, the output of the comparator 66 switches. Thus, the peak detecting circuit 70 will not be affected by signals produced by the sensor 16 in response to nicks and scratches in the engine flywheel.

Depicted in FIG. 2F is the electrical signal produced by the magnetic sensor 16 and in FIG. 2G is the output of the circuit 70. Thus, the circuits 60 and 70 convert the electrical signals produced by the sensor 16 into a train of second pulses, the first occurring at $a_1$, a second at $a_4$ and a third at $a_7$. Angle $a_4$ is 360° plus $a_1$, and angle $a_7$ is 360° plus $a_4$. Angle $a_6$ is 720°. The difference between angles $a_7$ and $a_6$ is the angle $a_1$.

It should be noted that the train of second pulses (FIG. 2G) is twice the frequency of the train of first pulses (FIG. 2C), because each cylinder fires once every other revolution of the crank shaft.

The first and second pulse trains are applied to a microprocessor 90 which is programmed to determine the frequency of the first train of pulses and/or the second train of pulses and to convert such frequency to engine speed.

It is important to note that a "combustion" pulse starts at 0° (FIG. 2C) and a "magnetic" pulse starts at angle $a_1$. Thus the angle $a_1$ represents the number of degrees between combustion in the number one cylinder and the marking means. To determine the actual angle, there must be subtracted the offset angle, that is, the angle between the probe receptacle and the notch when the piston in the number one cylinder is at top dead center. The offset angle is specified by the automobile manufacturer. If $a_1$ was 30°, for example, and the offset angle was 20°, then the timing angle of the number one cylinder would be 10°.

A keyboard 91 is coupled to the microprocessor 90. One applies to the keyboard 91 the offset angle associated with the specific engine under test. The microprocessor 90 determines the number of degrees between the discontinuity and combustion, subtracts the offset angle applied via the keyboard 91 to compute the timing angle, that is, the number of degrees between top dead center and combustion. The microprocessor 90 is coupled to a display interface 92 which in turn is coupled to digital displays 93 on which appear the engine speed, the timing angle and other messages to be described. A clock (not shown) in the microprocessor 90 has its frequency established by a crystal 94. The frequency of the clock is 400 KHz. A divider 95 reduces the frequency to 100 KHz in order to generate 10 µs. clock pulses.

Figure 3:
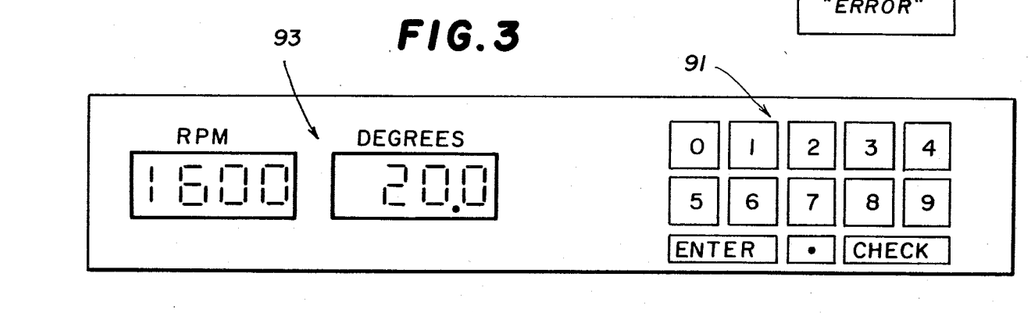
FIG. 3 depicts the front panel of the housing in which the circuitry of FIG. 1 is located.

Turning now to FIG. 3, there is depicted the front panel of the housing which contains the apparatus 10. The keyboard 91 consists of ten keys "0" to "9", an "enter" key, a "check" key and a decimal-point key. The enter key is used to prepare the apparatus 10 for receiving an offset angle by way of the numbered keys and then to enter the offset angle after the number keys have been actuated. Whenever a combustion sensor is in place and the engine is running, the user can be informed at any time of the offset angle that had been programmed into the apparatus 10, by depressing the check key.

The displays 93 on the front panel consist of two sections labelled "rpm" and "degrees", respectively relating the speed of the engine and the timing angle of a selected cylinder.

As will be explained, the microprocessor 90 is programmed to receive offset angles on the keyboard 91 from 0° to 359.5° in 0.5° increments. If it is desired to analyze the number one cylinder in an eight-cylinder diesel engine, the magnetic sensor 16 would be mounted as previously explained and the luminosity sensor 12 would be applied to the glow plug hole for the number one cylinder. The serviceman would determine the offset angle from the automobile manufacturer's specifications. Suppose that it is 20°. He would first depress the "enter" key, then the "2" key, then the "0" key, then the decimal-point key, then the "0" key again and finally the "enter" key. The engine speed and the timing angle of the number one cylinder would appear in the displays 93. The apparatus 10 enables him to analyze the timing angle of the other cylinders of the engine if so desired. Suppose he desires to analyze the cylinder that fires previous to the number one cylinder. He would replace the glow plug in that cylinder with the luminosity sensor 12 and enter a value of 110 (90° plus the 20° offset angle). In an eight-cylinder engine, the cylinders fire in order every 90°. As previously explained, the keyboard 91 only accommodates angles from 0° to 359.5°. To check the timing of a given cylinder or one that fires 360° before or after such cylinder, the same angle is entered into the keyboard 91, but the luminosity sensor would be inserted into the glow plug of the appropriate cylinder. For example, the two cylinders that respectively fire 180° before and after the number one cylinder can be monitored by entering 200 (180° plus the 20° offset angle) into the keyboard 91. The cylinder that fires 270° before the number one cylinder and the cylinder that fires 90° after the number one cylinder can be monitored by entering a value of 290 (270° plus the 20° offset angle) into the keyboard.

In a four-cylinder engine the procedure is the same except that there is 180° between pulses plus the offset angle. In a six-cylinder, even firing engine the entry is based on 120° between pulses plus the offset angle.

In an operating embodiment, the microprocessor 90 was Intel's 8049.

Figure 4A:
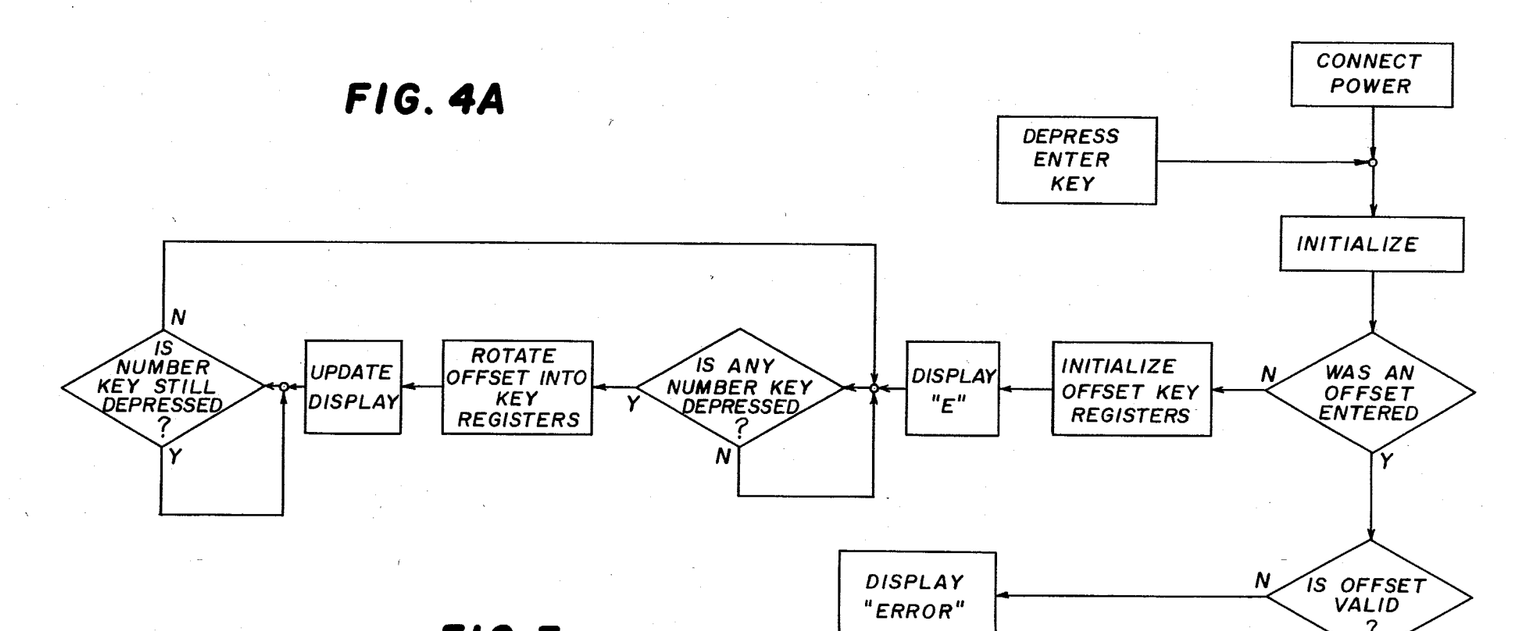
FIGS. 4A, B, C depict a flow chart of the program in the microprocessor of FIG. 1.
Figure 4B:
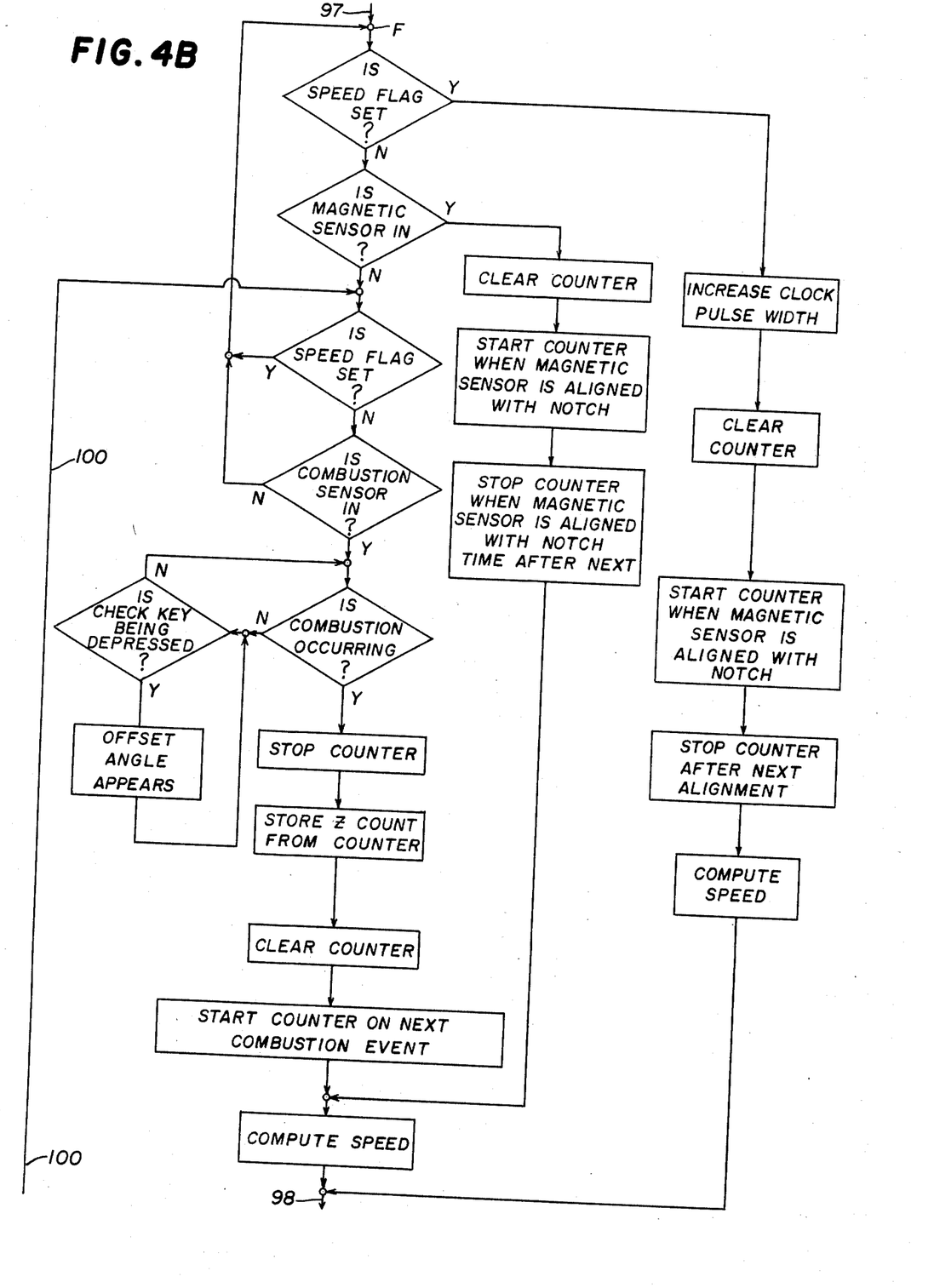
Figure 4C:
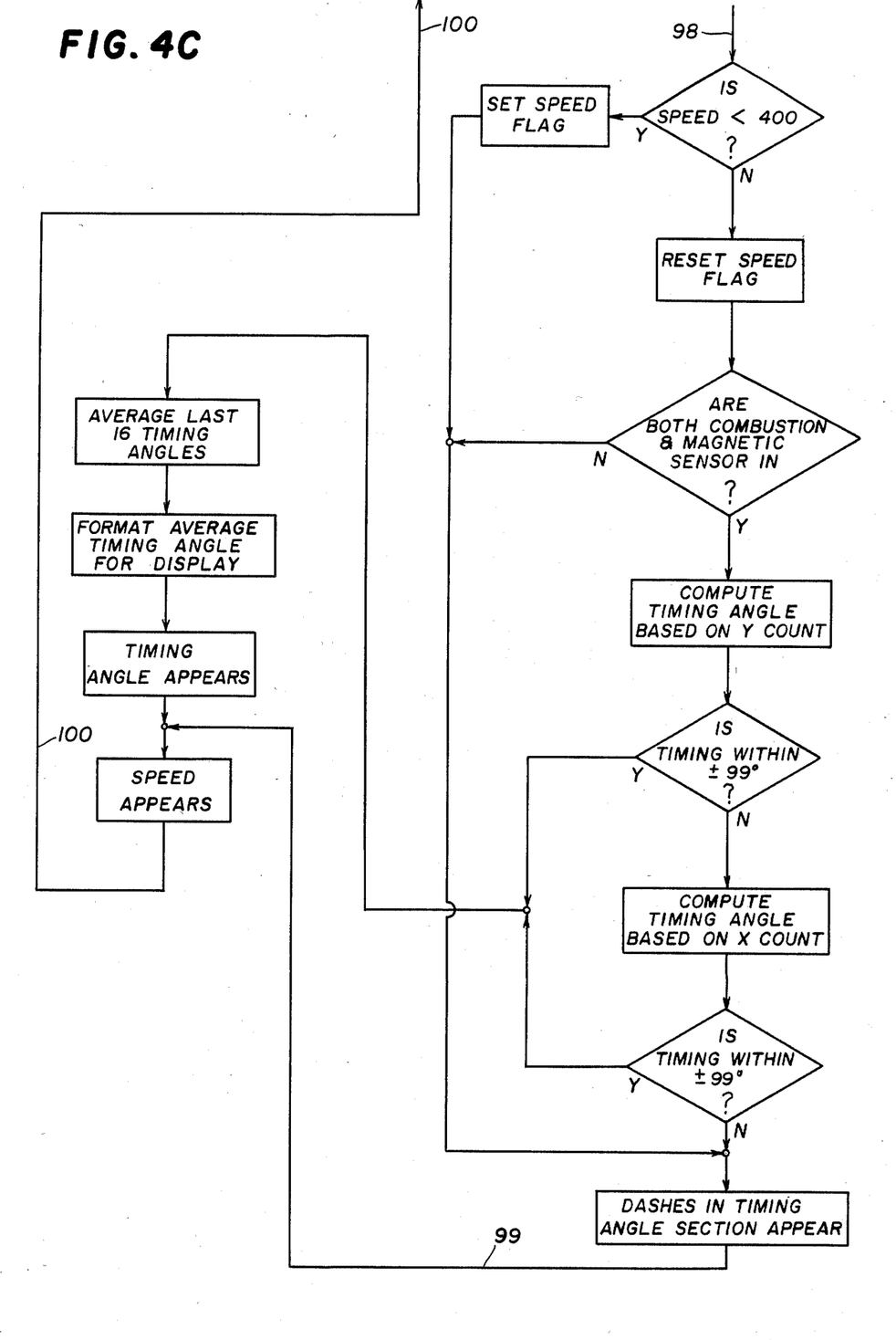

Turning now to FIGS. 4A, B and C, the flow chart depicted therein will be used to explain the program under which the microprocessor 90 operates. When the apparatus 10 is connected to a source of DC power and when the enter key is depressed, the microprocessor is initialized, meaning that certain internal registers are cleared and others are placed in a predetermined initialized condition, and the displays are formatted. After initialization, inquiry is made as to whether an offset angle had been entered. If not, the register which stores the offset angle supplied by the offset keys is initialized and the letter "E" appears in the rpm section of the displays 93. Inquiry is made as to whether any number key is being depressed. The answer is "no". The apparatus 10 waits for a number key to be depressed by continuing to ask that question. When a number key is depressed, the number is rotated into the offset key registers, meaning that the numbers previously entered are moved forward and the first one entered is shifted out. The number appears in the degrees section of the displays. Inquiry is made as to whether the particular number key is still being depressed. If and when it is not, the flow returns to wait for the next number key to be depressed. If the number key is still being depressed, the flow returns to the same question until the key is no longer depressed.

After an offset angle is applied, the enter key is depressed. Then, when the question is asked whether an offset was entered, the answer is "yes". The apparatus 10 accommodates an offset angle of between 0° and 359.5° in 0.5° increments. Any other offset angle would not be accepted. If the offset angle applied to the keyboard does not have one such value, or no offset angle was entered, then the word "Error" or "Err" will appear in the degrees section of the displays, and "OFFSET" or "OFFS" will appear in the rpm section.

If, on the other hand, the offset is valid, a speed flag will be set. The speed flag is set whenever the engine speed is less then 400 rpm. Initially, it is assumed that the speed is less than 400 rpm. Therefore, the speed flag is set. Referring to FIG. 4B, program flows along the line 97. Inquiry as to whether the speed is set will be answered "yes".

The microprocessor contains a counter and a clock for delivering clock pulses thereto. Normally, the delivered clock pulses have a width of 10 µs. When the engine speed is less than 400 rpm, the width of the clock pulses is increased to 80 µs.

The counter is cleared. The counter is started, referring to FIG. 2, at angle $a_1$, namely, on the occurrence of a pulse from the magnetic sensor 16 which, as previously explained, occurs when the sensor is aligned with the notch or other discontinuity in the rotating wheel. The counter is stopped at $a_4$ on the occurrence of the next magnetic event; i.e., the next time the magnetic sensor 16 is aligned with the notch. The engine speed in rpm is computed according to the formula 60 secs. per min. divided by $(80 \times 10^{-6})$ times the number of pulses between $a_1$ and $a_4$ (the "N" count). In other words:

750,000/N count

Referring to FIG. 4C, the program flows along the line 98. Inquiry is made as to whether the speed is less than 400 rpm. The engine speed is less than 400 rpm normally only during cranking, that is, when the engine is being started. However, during normal operation, the engine speed will be greater than 400 rpm and the answer to the question will be "no". The speed flag will then be reset. An inquiry is made as to whether both the combustion sensor and the magnetic sensor are in place in the engine. The combustion sensor is generic to the luminosity sensor 12 and the inductive sensor 14. Both sense the combustion event, the former in a diesel engine and the latter in a spark-ignited engine. If they are both in place, then the timing angle would normally be computed. In the first pass, there is insufficient information to compute the timing angle and it will be assumed, therefore, that the timing angle is outside the range of plus and minus 99° whereupon dashes will appear in the "degrees" section of the displays. The engine speed, as computed above, appears in the "rpm" section of the displays.

The program flow is along the line 100 to FIG. 4B. Inquiry is made as to whether the speed flag is set. Since the speed flag had been reset because the engine speed was computed to be greater than 400 rpm, the answer is "no". It is assumed that the combustion sensor is in place. Thus, the answer to the next question is "yes". Next, inquiry is made as to whether combustion is then occurring. If it is, then the counter is stopped. Since it is assumed that the very first combustion event is taking place there is no count to be stored. However, it will be assumed that the program is in its steady state condition and numerous combustion events have already taken place. The number of pulses between combustion events at 0° and $a_6$ are stored as the Z count. Then the counter is cleared. The counter is restarted on the next combustion event. Then the speed is computed according to the formula: 60 sec. per min. times two revolutions divided by $(10 \times 10^{-6})$ times the Z count. With the speed being greater than 400 rpm the clock pulses revert to their normal, narrower width of 10 μs. In other words, the speed is computed as follows:

$$\frac{12 \times 10^6}{Z \text{ count}}$$

Figure 5:
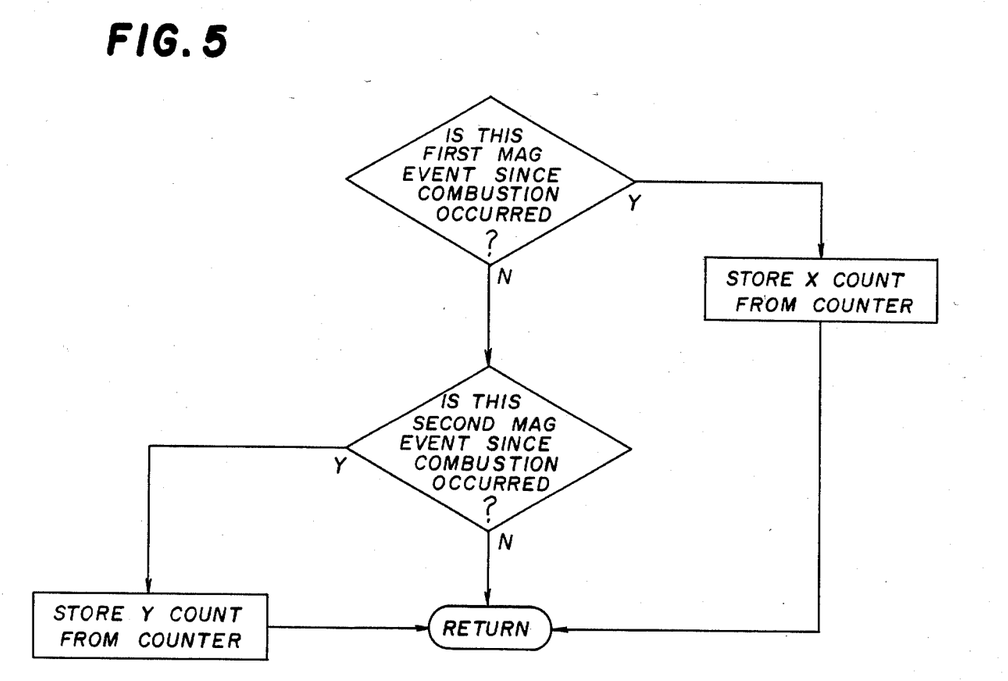
FIG. 5 depicts the interrupt routine for the program.

Attention is directed to FIG. 5 which depicts the flow chart for the so-called "interrupt" routine. The train of pulses derived from the magnetic sensor, that is, the train depicted in FIG. 2G, is applied to the INT input of the microprocessor, that is, the interrupt input. A signal applied to the interrupt input of the microprocessor halts temporarily further activity on the main program. Instead, activity is immediately directed to the interrupt routine. When that routine is finished, the program flow continues at the point in the flow chart at which a pulse commencing the interrupt routine appeared. At $a_1$, a magnetic pulse appears on the interrupt input causing commencement of the interrupt routine. The first question is whether this pulse is the first one since combustion occurred (that is at 0°). The answer being "yes", the number of clock pulses from 0° when the counter was started to $a_1$ when the interrupt routine is started is stored as what is referred to as the "X" count. In the interrupt routine, information in the counters is read; the counters are not stopped. The next magnetic event occurs at $a_4$, thereby starting the interrupt routine again. Now when the question is posed whether the pulse at $a_4$ is the first magnetic event since combustion, the answer is "no". Inquiry is made as to whether that pulse is the result of the second magnetic event since combustion occurred. If it is not, then the main program takes over wherever it was discontinued. Since it is the second event as can be seen in FIG. 2G, the number of clock pulses counted by the counter starting at 0° to angle $a_4$ is stored as the "Y" count. Thus, there is stored an X count and a Y count. The main program then takes over at the point where interruption occurred.

Returning now to FIG. 4C, inquiry is made as to whether the engine speed is less than 400 rpm. In the situation being discussed, it is not. The speed flag is reset (actually it had already been reset). The question whether both the combustion sensor and magnetic sensor are in place is answered "yes".

The timing angle is computed according to the following formula:

$$\frac{720° \times Y \text{ count}}{Z \text{ count}} - \text{offset angle}$$

Then there is posed the question whether the timing angle thus computed is within a range of plus and minus 99°. In this situation, the answer will be "no" since $a_4$ is more than 360°. Then the timing angle based on the X count is computed according to the following formula:

$$\frac{720° \times X \text{ count}}{Z \text{ count}} - \text{offset angle}$$

The question is again posed whether the timing angle thus computed is within the plus and minus 99° range. This time the answer is "yes". In the above example, with the angle $a_1$ equal to 30° and the offset angle equal to 20°, the timing angle would be 10° and therefore within the plus and minus 99° window.

The last sixteen timing angles are averaged, meaning the present reading is averaged with the previous fifteen readings to provide continuous updating. The displays are formatted by converting the binary information to BCD information. The timing angle appears in the degrees section of the displays. The engine speed computed using the Z count appears in the rpm section of the displays. The displayed timing angle and engine speed are continuously updated.

The data flow is routed back along the line 100 to FIG. 4B to start the just-described portion of the program again. That is continuously done to obtain continuously updated engine speed and timing angle based on the last sixteen measurements.

Whenever a combustion sensor is in place, the operator can determine the offset angle applied to the keyboard at any time by depressing the "check" key. The next instant the question is posed whether combustion is occurring (middle of FIG. 4B) and the answer is "no". The question is posed whether the "check" key is being depressed. If not, then the program stays in the loop until the key is depressed or combustion occurs. When combustion occurs, the counter is stopped, etc. When the check key is depressed, the offset angle appears in the degrees section of the displays. The question is again posed whether the check key is being depressed and, if so, the offset angle continues to appear. As soon as the check key is released, data flow moves back to the main path to inquire about combustion occurring.

If the timing angle measured on the basis of the X count is also outside the plus and minus 99° range, then dashes are displayed in the degrees section of the display and the engine speed, computed using the Z count, appears in the rpm section of the displays.

Due to the ability of the apparatus 10 to accept entry of an offset angle of up to 359.5°, the timing angle can be checked on any cylinder of a given engine. The above description involves insertion of the combustion sensor into the number one cylinder. In an eight-cylinder engine, each cylinder is 90° of crankshaft revolution away from the next cylinder. Thus, for the second cylinder in the firing order 270° would be added to the offset angle. In the foregoing example an offset angle of 20° is assumed. Thus, to check the timing angle of the second cylinder in the firing order, 290° would be entered into the keyboard. To check the third cylinder in the firing order, the combustion sensor would be inserted into the third cylinder and 200° would be added. In a six-cylinder, even firing engine the spacing between adjacent cylinders is 120°. Thus, to check the second cylinder in the firing order, 240° would be added to the offset angle. If the offset angle was 20°, then one would enter 260° into the keyboard to check the firing of the second cylinder. Finally, in a four cylinder engine, the spacing is 180° and to check the second cylinder again using an offset angle of 20°, the number entered into the keyboard would be 200.

Returning to the flow chart it will be assumed that the magnetic sensor is in place, the combustion sensor is not, and the engine speed is greater than 400 rpm. Referring to the top of FIG. 4B, the speed flag is not set, having been reset because the speed is greater than 400 rpm. The magnetic sensor being in place, the counter is cleared.

The counter is started, referring to FIG. 2, at angle $a_1$, namely, on the occurrence of a pulse from the magnetic sensor 16, which occurs when the sensor is aligned with the notch in the rotating wheel. The counter continues counting until the notch after next is aligned, that is, at $a_7$ which is twice the N count. The engine speed in rpms is computed according to the following:

$$\frac{12 \times 10^6}{2N}$$

The same compute-speed step is utilized as when speed is calculated using information obtained from the combustion sensors, but since the frequency of occurrence is doubled so must the time during which pulses are counted. Because the speed is greater than 400 rpm, the standard pulse width of 10 $\mu$s is utilized.

Then, referring to FIG. 4C, inquiry is made as to whether the speed is less than 400 rpm. Since it is not, the speed flag is therefore reset (actually it had already been reset). Inquiry is made as to whether both the combustion sensor and the magnetic sensor are in place in the engine. Since the combustion sensor is not in place, the answer is "no" and the flow is to the bottom of FIG. 4C. Dashes will appear in the "degrees" section of the displays. Program flows along the line 99 to cause the speed in rpm to appear in the "rpm" section of the displays. Program flow is then routed along the line 100 back to FIG. 4B. Inquiry is made as to whether the speed flag is set. The answer being no, the next question is whether the combustion sensor is in place in the engine, the answer being no, the flow is brought back to point F at the top of FIG. 4B. Inquiry is made as to whether the speed flag is set; again the answer is no. The magnetic sensor is in place and therefore the counter is cleared, started and stopped, etc., thus completing the loop for the situation where the combustion sensor is not in place, the magnetic sensor is in place and the speed is greater than 400 rpm.

Now, it will be assumed the combustion sensor is in place, the magnetic sensor is not and the engine speed is still greater than 400 rpm.

Referring to the top of FIG. 4B, the speed flag is not set, having been reset because the speed is greater than 400 rpm. Inquiry is made as to whether the magnetic sensor is in place, the answer being no. Inquiry is made as to whether the speed flag is set, the answer being no. Inquiry is made as to whether the combustion sensor is in place. The answer is yes. Inquiry is made as to whether combustion is occurring. Again, it will be assumed that the program is in its steady state condition and that numerous combustion events have already taken place. The counter had already started on a combustion event occurring at 0°. Now the counter is stopped and the number of pulses between combustion events at 0° and $a_6$ are stored as the Z count. Then the counter is cleared. The counter is restarted on the next combustion event and the speed is computed according to the formula:

$$\frac{12 \times 10^6}{Z \text{ count}}$$

Inquiry is made as to whether the speed is less than 400 rpm. The answer being no, the speed flag is reset (it has already been reset). Inquiry is made as to whether both the combustion and magnetic sensors are in place. Since the magnetic sensor is not, dashes appear in the "degrees" section of the displays and the speed appears in the "rpm" section of the displays.

Program flow is routed along the line 100 to FIG. 4B. The speed flag is not set and the combustion sensor is in place, thereby completing the loop of program flow for the condition where the combustion sensor is in place, the magnetic sensor is not and the speed is greater than 400 rpm.

Now, consideration will be given to the situation when the engine speed is less than 400, say at about 190 rpm, in order to determine the speed during starting, i.e. the cranking speed. Inquiry is made as to whether the speed flag is set at the top of FIG. 4B. The answer is yes. The width of the clock pulses is increased to 80 $\mu$s. The counter is then cleared. The counter is started, referring to FIG. 2, at an angle $a_1$, namely, on the occurrence of a pulse from the magnetic sensor which, as previously explained, occurs when the sensor is aligned with the notch in the flywheel. The counter is stopped at $a_4$ on the occurrence of the next magnetic event. The engine speed in rpms is computed according to the formula:

$$750,000/N \text{ count}$$

Referring to FIG. 4C, inquiry is made as to whether the speed is less than 400. The answer being yes, the speed flag is set (actually had already been set) and program flow is routed to the bottom of FIG. 4C causing dashes to appear in the "degrees" section of the displays. Program flows along the line 99 to cause the speed to appear in the "rpm" section of the displays. Program flow is routed along the line 100 back to FIG. 4B. The question is asked whether the speed flag is set. The answer being yes, program flow is routed to point F. Again the same question is answered with a yes, thereby completing the loop for the condition where the engine speed is less than 400 rpm. Speed is computed on the basis of the data supplied by the magnetic sensor and it therefore must be in place to determine engine speed when it is less than 400 rpm. Whether or not the combustion sensor is in place is not relevant.

Figure 6:
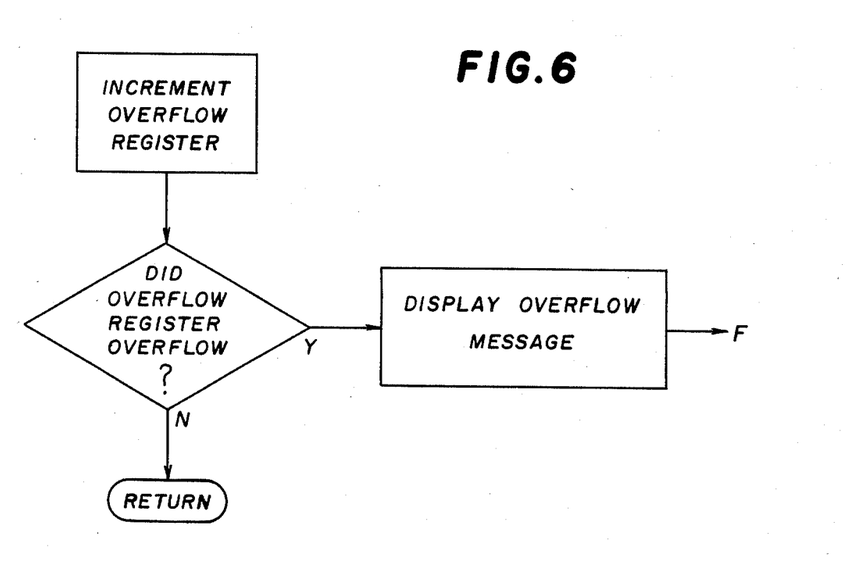
FIG. 6 depicts the overflow subroutine.

FIG. 6 depicts the overflow routine. The microprocessor contains overflow registers. Any time an action commences in the main program, an overflow register is incremented. A timer is associated with the overflow registers. When the overflow registers have counted 5.24 seconds, an overflow message will appear in the "rpm" section of the displays and program flow will be routed to point F (top of FIG. 4B) to start the sequence again. If the overflow does not take place, then the data flow returns to the main program. Thus if neither sensor is in place or if the engine is not running, the overflow message will appear after about about five seconds.

In computing timing angles, the Y count and the X count were determined. The timing angle based on the Y count was computed. If such angle was outside the range of plus and minus 99°, the timing was computed based on the X count. If all engines had just one discontinuity in the flywheel then one timing angle calculation would be required based on the number of pulses between the combustion event and the magnetic event.

There are however engines which have two notches or projections in the flywheel. One such engine has one projection at 12° before top dead center and another one 20° after top dead center. Even with such engines, two timing angle calculations are unnecessary if it could be assured that the combustion event always occurred between the two projections. However, there are situations where a engine could be either mistimed so severely or the engine designed purposely to have the combustion event lead both projections, that the timing angle based on both would have to be calculated. The timing angle is always based on one of them and it would not be sufficient simply to ignore the second projection occurring after combustion because the engine could be so mistimed or purposely timed that combustion occurs before the first notch.

Reference is made to FIG. 2H, which depicts a magnetic event at angle $a_8$ and a magnetic event at angle $a_1$ occurring respectively on either side of the combustion event. Additional magnetic events occur at $a_3$, $a_4$, $a_5$ and $a_7$. The next combustion event appears at $a_6$ between $a_5$ and $a_7$. No combustion event, of course, occurs between $a_3$ and $a_4$; $a_3$ occurring 360° after $a_8$ and $a_5$ occurring 360° after $a_3$. Under these conditions, the Y count will be the number of pulses occurring between 0° and $a_8$ and the X count will be the number of pulses occurring between 0° and $a_1$. The timing angle based on the Y count will be outside the plus and minus 99° range and therefore will be discarded. The timing angle that appears in the "degrees" section of the displays will be based on the X count. Suppose that the engine is so mistimed or was designed as to be timed such that combustion occurs before $a_8$. Then the Y count would be the number of degrees between 0° and $a_1$. That would be determined first, since it would be the second magnetic event after combustion occurred (see FIG. 5). The timing angle based on such count would be within the range of plus and minus 99° and therefore that timing angle would be appear in the "degrees" section of the displays. The X count being the number of pulses between 0° and $a_8$ would have been stored but the timing angle based thereon would not have been computed and therefore it would have been ignored.

Thus, by utilizing a two tier computation, the timing angle of an engine in which the flywheel has two discontinuities, can be determined, by always ignoring the same discontinuity. As a matter of fact the third and fourth discontinuities, at $a_3$ and $a_4$ are also ignored. The calculation can always be made on the same discontinuity, in the above example, the one normally following top dead center, and the other one, namely, the one preceding top dead center is ignored.

To determine the engine speed during cranking, the fuel supply in a diesel engine is disabled. In a spark ignited engine, the ignition system is disabled. Then the "enter" button is depressed. The starter is operated and the cranking speed is displayed. The reading remains for about about five seconds after which time the overflow register would overflow (FIG. 6) and the data flow would be back in the main routine. Similarly, cranking must take place within about about five seconds. The overflow registers include two eight-bit counters which count either 80 $\mu$s or 10 $\mu$s pulses. When 80 $\mu$s pulses are applied to the overflow registers, during cranking analysis of the engine, the overflow time is 5.24 seconds ($256 \times 256 \times 80 \times 10^{-6}$) or 0.655 second for 10 $\mu$s pulses. The purpose of increasing the pulse width during cranking is to obtain a longer time before overflow takes place. Then the engine speed will appear in the "rpm" section of the display about five seconds after the serviceman completes cranking of the engine, giving him enough time to read the displays. A retention time of less than one second would not be long enough for him to do so.

What has been described therefore is an apparatus which is capable of analyzing the timing and speed of a diesel engine or a spark-ignited engine. It can determine the timing angle of any kind of engine currently manufactured or one likely to be manufactured in the future, because the range of timing angle is very substantial. Both the engine speed and timing angle are measured to a high degree of accuracy by virtue of the program and the fact of its appearing digitally. Cranking engine speeds are also readily determined. The same instrument displays engine speed by determination of the frequency of the top-dead center event in either a diesel engine or a spark-ignited engine or by determining the frequency of flashes in the selected cylinder or determining the frequency of sparks in a spark-ignited engine.

We claim:

1. Timing/tachometer apparatus for an internal combustion engine having a rotating part with mark means that passes a fixed point a predetermined offset angle after top dead center of a selected cylinder, said apparatus comprising a first sensor adapted to be coupled with respect to the selected cylinder to produce recurring first electrical signals in response to recurring combustion in the selected cylinder; first circuit means for converting the first electrical signals into a train of first pulses; a second sensor adapted to be mounted adjacent to the fixed point for producing recurring second electrical signals in response to recurring rotation of the rotating part; second circuit means for converting the second electrical signals into a train of second pulses; keyboard means for manually receiving the predetermined number of degrees of offset angle; processor means coupled to said first and second circuit means and to said keyboard means and including counter means and clock means delivering clock pulses thereto; said processor means operating under stored program for: (a) starting said counter means periodically on the occurrence of a first pulse, (b) stopping said counter means on the occurrence of an ensuing first pulse, (c) storing as a first value the number of clock pulses counted by said counter means between each starting and stopping thereof, (d) computing engine speed based on the first value, (e) storing as a second value the number of clock pulses counted by the counter between each starting thereof and an ensuing second pulse, (f) storing as a third value the number of clock pulses counted by the counter between each starting thereof and another ensuing second pulse, (g) computing degrees of rotation based on the second value, (h) subtracting the predetermined offset angle from the degrees of rotation based on the second value to provide a first timing angle (i) determining whether the first timing angle is within a given range, and if it is not, then (j) computing the degrees of rotation based on the third value, (k) subtracting the predetermined offset angle from the degrees of rotation based on the third value to provide a second timing angle, and (1) determining whether the second timing angle is within the given range, and means for digitally displaying the first or second speed and the engine timing angle.

2. The timing/tachometer apparatus of claim 1, wherein the first mentioned ensuing second pulse follows the another ensuing second pulse.

3. The timing/tachometer apparatus of claim 1, wherein the given range is plus and minus 99°.

4. The timing/tachometer apparatus of claim 1, wherein a message appears on said display means signifying the absence of a timing measurement if the third timing angle is outside the given range.

5. The timing/tachometer apparatus of claim 1, wherein said processor means has an interrupt input coupled to said second circuit means, said processor means being programmed to interrupt the normal program upon the occurrence of second pulses.

6. Timing/tachometer apparatus for an internal combustion engine having a rotating part with mark means that passes a fixed point a predetermined offset angle after top dead center of a selected cylinder, said apparatus comprising a first sensor adapted to be coupled with respect to the selected cylinder to produce recurring first electrical signals in response to recurring combustion in the selected cylinder; first circuit means for converting the first electrical signals into a train of first pulses; a second sensor adapted to be mounted adjacent to the fixed point for producing recurring second electrical signals in response to recurring rotation of the rotating part; second circuit means for converting the second electrical signals into a train of second pulses; keyboard means for manually receiving the predetermined offset angle; processor means coupled to said first and second circuit means and to said keyboard means and including counter means and clock means delivering thereto clock pulses having a shorter pulse width and a longer pulse width; said processor means operating under stored program for: (a) starting said counter means periodically on the occurrence of a first pulse, (b) stopping said counter means on the occurrence of an ensuing first pulse, (c) storing as a first value the number of clock pulses counted by said counter means between each starting and stopping thereof, (d) computing engine speed based on the first value, (e) storing as a second value the number of clock pulses counted by the counter between each starting thereof and an ensuing second pulse, (f) computing degrees of rotation based on the second value, (g) subtracting the predetermined offset angle from the degrees of rotation to provide the timing angle in degrees, and (h) initially determining if the engine speed is less than a predetermined value, and, if it is, then causing said clock means to deliver clock pulses with the longer pulse width, and if the engine speed is greater than the predetermined value, causing said clock means to deliver clock pulses with the shorter pulse width; and means for digitally displaying the engine speed and the engine timing.

7. The timing/tachometer apparatus of claim 6, wherein initial determination of engine speed is made by assuming it is less than the predetermined value, whereby the engine speed is initially computed using the pulses of longer pulse width.

8. The timing tachometer apparatus of claim 6, wherein the predetermined value is 400 rpm.

9. Timing/tachometer apparatus for an internal combustion engine having a rotating part with mark means that passes a fixed point a predetermined offset angle after top dead center of a selected cylinder, said apparatus comprising a first sensor adapted to be coupled with respect to the selected cylinder for producing recurring first electrical signals in response to recurring combustion in the selected cylinder; first circuit means for converting the first electrical signals into a train of first pulses; a second sensor adapted to be mounted adjacent to the fixed point for producing recurring second electrical signals in response to recurring rotation of the rotating part; second circuit means for converting the second electrical signals into a train of second pulses; processor means coupled to said first and second circuit means and operating under stored program for: (a) determining the time between the pulses in one of the trains and converting such time into engine speed in rpm and if such one train is not present, then (b) determining the time between the pulses in the other one of the trains and converting the last-mentioned time into engine speed in rpm; and means for digitally displaying the engine speed.

10. The timing/tachometer apparatus of claim 9, wherein said processor means includes counter means and a clock delivering clock pulses thereto, said processor means being further programmed for: (d) starting said counter means periodically on the occurrence of a first pulse, (e) stopping said counter means on the occurrence of an ensuing first pulse, (f) storing the number of clock pulses counted by said counter means between each starting and stopping thereof, and (g) computing engine speed based on the counted number of clock pulses.

11. The timing/tachometer apparatus of claim 10, wherein the ensuing first pulse is the one immediately following the first-mentioned first pulse.

12. The timing/tachometer apparatus of claim 9, wherein said processor means includes counter means and a clock delivering clock pulses thereto, said processor means being further programmed for: (d) starting said counter means periodically on the occurrence of a second pulse, (e) stopping said counter means on the occurrence of an ensuing second pulse, (f) storing the number of clock pulses counted by said counter means between each starting and stopping thereof, and (g) computing engine speed based on the counted number of clock pulses.

13. The timing/tachometer apparatus of claim 12, wherein the ensuing second pulse is the one immediately following the first-mentioned second pulse.

14. The timing/tachometer apparatus of claim 12, wherein the ensuing second pulse is the one after the one immediately following the first-mentioned second pulse.

15. Timing/tachometer apparatus for a diesel engine and a spark-ignited engine, each engine having a rotating part with mark means that passes a fixed point a predetermined offset angle after top dead center of a selected cylinder, the spark-ignited engine having a spark plug associated with each cylinder and a conductor coupled thereto, said apparatus comprising a first sensor adapted to be coupled in the selected cylinder of a diesel engine to produce recurring first electrical signals in response to recurring combustion in the selected cylinder; a second sensor adapted to be coupled to the spark-plug conductor associated with the selected cylinder of a spark-ignited engine for producing recurring second electrical signals in response to recurring spark events, first circuit means for converting the first electrical signals or the second electrical signals into a train of first pulses; a third sensor adapted to be mounted adjacent to the fixed point for producing recurring third electrical signals in response to recurring rotation of the rotating part; second circuit means for converting the third electrical signals into a train of second pulses; keyboard means for manually receiving the predetermined offset angle; processor means coupled to said first and second circuit means and to said keyboard means and operating under stored program for: (a) determining the time between the pulses in one of the trains and converting such time into engine speed in rpm, (b) determining the degrees of rotation between a first pulse and a second pulse, and (c) subtracting the predetermined offset angle from the degrees of rotation to provide the engine timing angle in degrees; and means for digitally displaying the engine speed and the engine timing angle.

* * * * *